Figure 1:
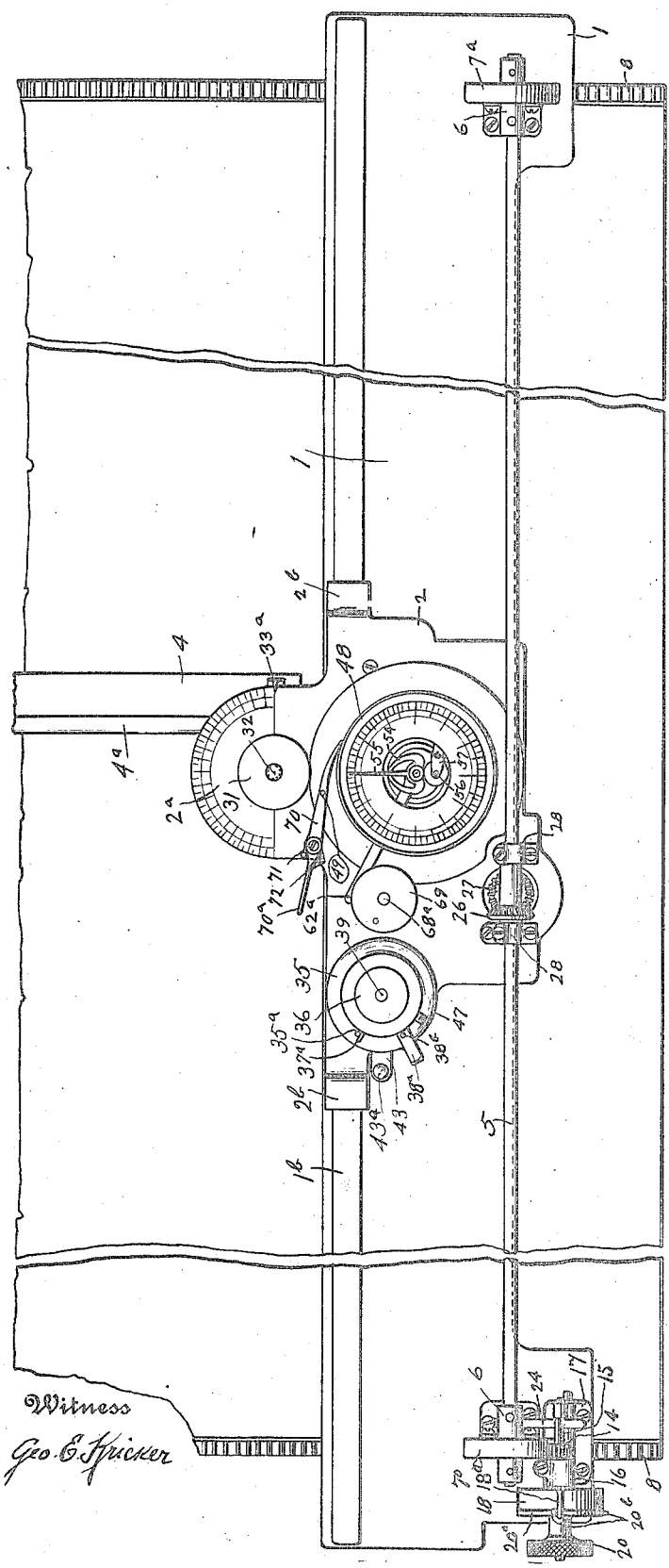

R. G. SHILEY.
DRAFTING INSTRUMENT.
APPLICATION FILED MAY 10, 1915.

1,180,083.

Patented Apr. 18, 1916.
3 SHEETS—SHEET 1.

Witness
Geo. E. Kricker

Inventor
R. G. SHILEY
Attorney

R. G. SHILEY.
DRAFTING INSTRUMENT.
APPLICATION FILED MAY 10, 1915.
1,180,083.
Patented Apr. 18, 1916.
3 SHEETS—SHEET 2.
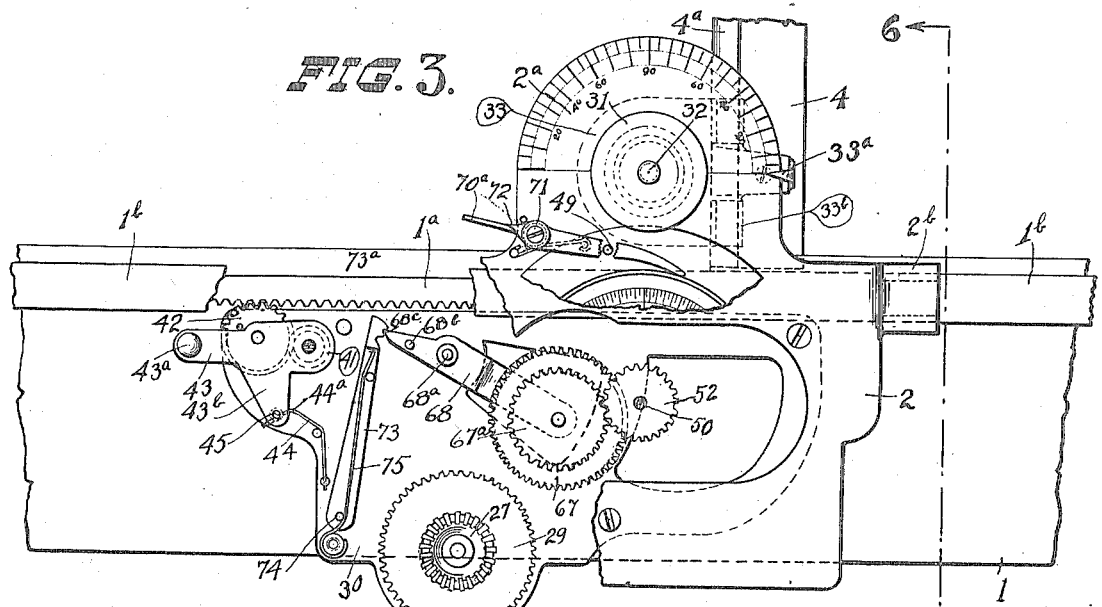
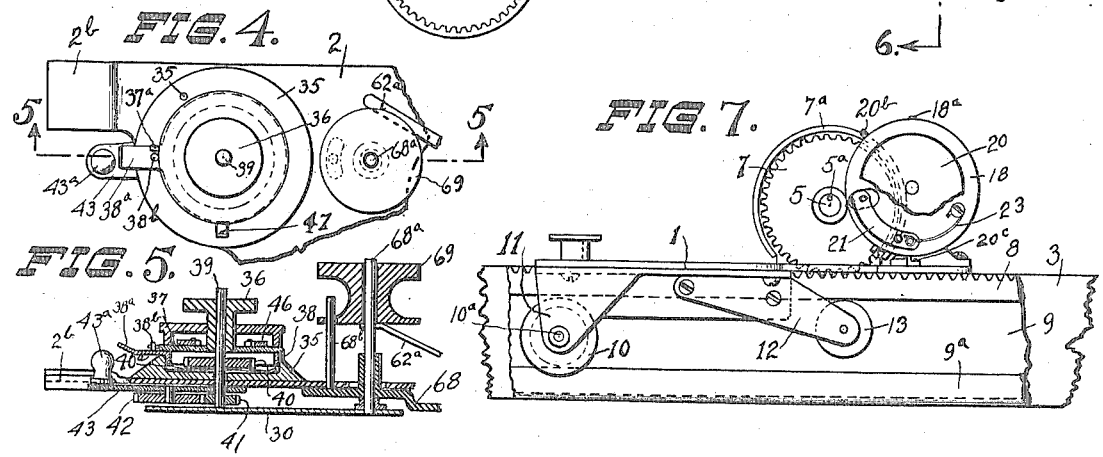
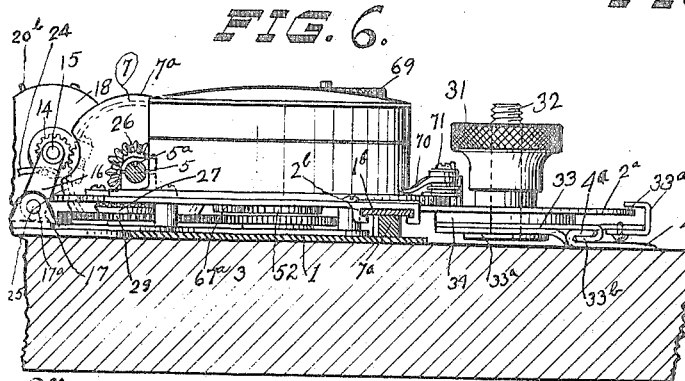
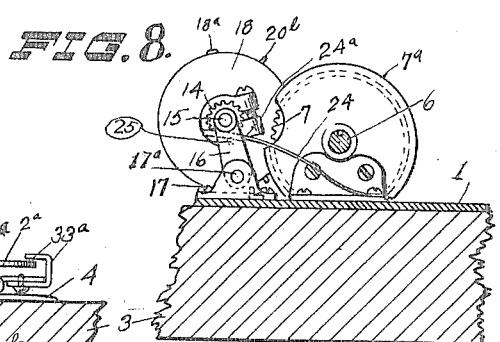
Witness
Geo. E. Kricker.
Inventor
R. G. Shiley
By Chas. L. Billman
Attorney

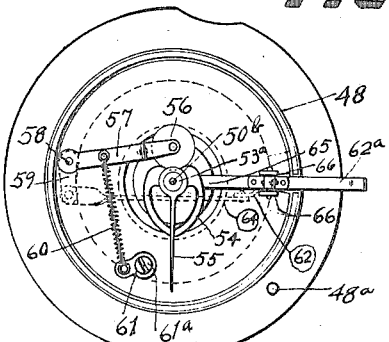

UNITED STATES PATENT OFFICE.

RICHARD G. SHILEY, OF CLEVELAND, OHIO.

DRAFTING INSTRUMENT.

1,180,083.

Specification of Letters Patent.

Patented Apr. 18, 1916.

Application filed May 10, 1915. Serial No. 26,940.

*To all whom it may concern:*

Be it known that I, RICHARD G. SHILEY, a citizen of the United States, residing at Cleveland, in the county of Cuyahoga and State of Ohio, have invented certain new and useful Improvements in Drafting Instruments, of which the following is a specification.

My invention relates to improvements in drafting and measuring instruments, the primary object being to provide a generally improved instrument or machine of this class having improved vertically and transversely movable carriages mounted upon and coöperating with a suitable drawing board and having improved actuating and indicating or measuring means whereby said carriages may not only be moved to certain predetermined and desired distances for vertical or horizontal lining or spacing, but such movements or distances traveled will also be accurately and automatically indicated at all times upon the dial of a common indicating or measuring instrument of an improved character particularly designed for an instrument of this class.

A further object is the provision of an instrument of this class having an improved carriage actuating and indicator controller device, together with means in connection with such carriage actuating and indicator controller device for throwing such indicating or measuring instrument into and out of engagement with the respective vertically and horizontally movable carriages for indicating or measuring the vertical or horizontal distances traveled by such carriages, as well as means for automatically returning or restoring the indicator needle to its initial or original position after each working movement or impulse given to the respective carriages.

A still further object is the provision of improved carriage actuating spacing and stopping mechanism for use in intermittently moving or actuating the respective carriages either simultaneously with or independently of the actuation of the indicator or measuring instrument.

A still further object is the provision of a generally improved instrument or machine of this class which will be exceedingly simple in construction, cheap of manufacture, efficient in use, as well as one which may be more readily adapted to meet the varying scales of drawings, and other varying demands of actual service.

With the above mentioned and other ends in view, the invention consists in the novel construction, arrangement, and combination of parts, hereinafter described, illustrated in one of its embodiments in the accompanying drawings, and particularly pointed out in the appended claims.

Figure 2:
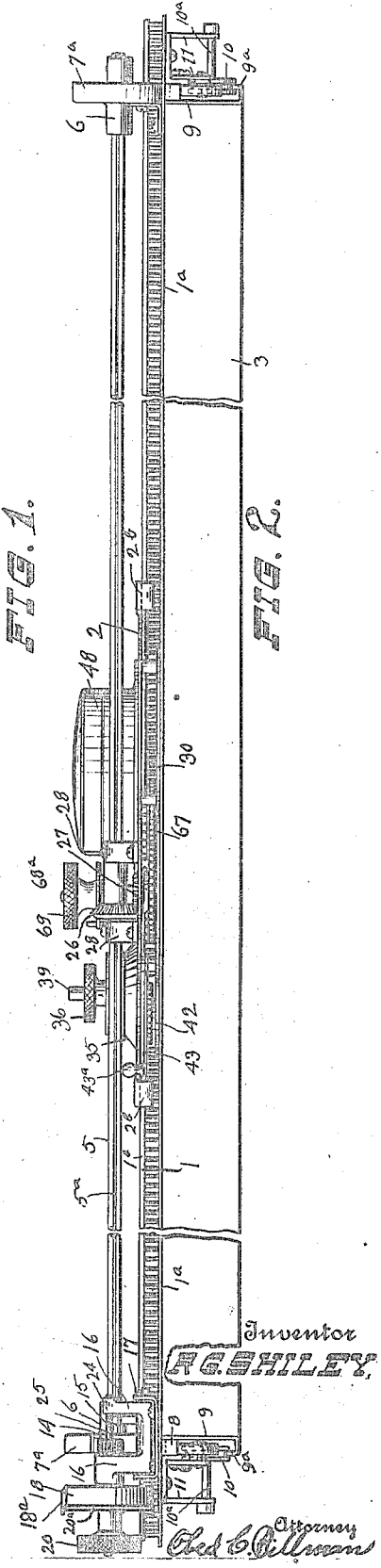

Referring now to the drawings, forming a part of this specification, Figure 1, is a plan view of the improved machine or drafting instrument as applied upon a drawing board. Fig. 2, a front elevation of the same. Fig. 3, a top plan view of the indicator or carriage gearing for indicating vertical and horizontal movements or the spaces or distances between vertical and horizontal lines, parallel ruling, or the like, the indicator or measuring instrument being removed and a portion of the upper carriage plate being removed, for the purpose of clearer illustration of the parts. Fig. 4, a top plan view of the indicator and carriage controller or knob, and the carriage actuating and spacing device for moving and spacing the indicator carriage horizontally along the main or vertically movable carriage, as in drawing or spacing vertically or angularly extending lines by means of the radius arm and protractor carried by the horizontally movable carriage. Fig. 5, a sectional view of the same, taken on line 5—5 of Fig. 4. Fig. 6, a cross sectional view of the main or vertically movable carriage, and side elevation of the indicator or horizontally movable carriage, taken on line 6—6 of Fig. 3. Fig. 7, a side elevation of the left hand side or end of the main carriage, and the guide and carriage actuating mechanism connecting the latter with the adjacent guide rack at the side of the drawing board. Fig. 8, an inner side elevation of the main carriage actuating mechanism, showing the actuating head or knob and stop mechanism thrown out of gear with the carriage sustaining and rack engaging wheel whereby the main carriage may be moved freely up and down independently of the intermittently operated carriage actuating mechanism. Fig. 9, a top plan view of the indicator or measuring instrument proper, detached. the dial being removed, and the casing circumferentially turned or swung about to a substantially diametrically opposite position to the normal position thereof shown in Fig. 1, this being done for the purpose of clearer illustration of the parts. Fig. 10, a cross sectional view of the same, the needle actuating clutch being in its normal or released position. Fig. 11, an enlarged detail view, partly in section, of the main carriage actuating or spacing knob, and its connected gearing, pawl and stop mechanism at the left of the carriage and drawing board. Fig. 12, an inner side elevation of the same, a portion of the gear casing being broken away for the purpose of clearer illustration of the parts. Fig. 13, an enlarged central vertical sectional view of the transversely movable indicator carriage actuating regulating and spacing device for moving the indicator and protractor carriage to the right or to the left thereby carrying the radius arm to certain predetermined distances as desired in actual service, such distances so moved being indicated by the indicator needle. Fig. 14, a top plan view of the same, the top cap and base being removed, showing the spring actuated pawl and pawl actuating and reversing lever, these pawls being shown in neutral position when out of contact with the actuating gear below. Fig. 15, a bottom side or reverse view of the same, the dotted lines indicating the position of the parts when one of the pawls is thrown into engagement with the actuating gear, and the other pawl out of engagement for moving the carriage in one direction, or vice versa, by a reverse position of the pawls and by the same movement of the actuating knob above. Fig. 16, a detail top plan view of the indicator carriage actuating regulating and spacing device, the pawl carrying disk plate being removed to show the spring pressed actuating gear below, as well as the stop carrying friction ring for regulating the throw or movement of the actuating knob.

Similar numerals of reference designate like parts throughout all the figures of the drawings.

The improved drafting machine or instrument comprises a transversely extending vertically movable carriage 1, carrying a transversely movable carriage 2, said carriage 1, being mounted above a drawing board 3, the transversely extending vertically movable carriage 1, being adapted to provide means for drawing the transversely extending or base lines, and the transversely movable carriage 2, carried by the carriage 1, being provided with a protractor $2^a$, and a radius arm 4, by means of which the vertical lines or angularly extending lines are adapted to be drawn upon the drawing paper or material on the drawing board 3.

As a means of moving and carrying the carriage 1, in a true horizontal or parallel position to the base or front edge of the drawing board, a main actuating or driving shaft 5, is mounted upon the carriage 1, through the medium of suitable bearings 6, near each end of the carriage 1, said driving shaft being provided at its ends with suitable carriage actuating and sustaining gear wheels 7, the latter engaging with and being adapted to travel upon suitable guide racks 8, at the sides of the drawing board. The carriage actuating and sustaining wheels 7, are preferably covered by means of wheel casings or housings $7^a$, as shown, and as a means of preventing lateral displacement, the guide racks 8, are preferably provided with side strips 9, (see Figs. 2 and 7 of the drawings) mounted at the sides of the drawing board, said side or guide strips 9, being provided about their lower edges with upturned guide flanges or ways $9^a$, upon which suitable grooved guide wheels 10, are adapted to travel, said guide wheels 10, being mounted on short shafts $10^a$, the shafts $10^a$, being mounted in depending brackets 11, carried beneath the ends of the carriage 1. The outer ends of the carriage 1, may also be provided with brackets 12, carrying guide wheels 13, adapted to ride upon and travel beneath the guide racks 8.

As a means of actuating or moving the transversely extending carriage a predetermined distance along the drawing board, and thereby regulating the distance between the lines drawn along the upper edge of the carriage 1, which also forms a ruling member for horizontally extending or base lines, one of the carriage actuating and sustaining gear wheels 7, on the actuating or driving shaft 5, is adapted to be engaged by a pinion 14, the pinion 14, being mounted on a short movable actuating shaft 15, the latter being carried in and being adapted to be rocked toward and from the gear wheel 7, by means of a pair of movable bearing arms 16, said pair of bearing arms 16, being mounted in the base bracket 17, (see Figs. 6 and 8 of the drawings) through the medium of a suitable bearing pin $17^a$. One of the bearing arms 16, is provided with a split head adapted to frictionally receive and retain an adjustably mounted stop casing 18, (see Figs. 11 and 12) said casing 18, surrounding an actuating gear 19, fixed on the shaft 15, and as a means of intermittently actuating the gear 19, an actuating knob or spacing head 20, is provided, said actuating knob or head 20, being loosely mounted on the shaft 15, and being provided with a base member $20^a$, carrying radially extending stop pins 20$^b$, one of said pins 20$^b$, being adapted to come into engagement with a stop bracket 20$^c$, (see Figs. 11 and 12) for limiting the forward movements of the actuating knob 20, the other stop pin being adapted to come into contact with a stop member 18$^a$, on the casing 18, it being apparent that by moving the stop casing 18, circumferentially the working impulses of the knob 20, and base member 20$^a$, will be regulated, such adjustment of the stop casing 18, being brought about by means of the adjusting screw 16$^a$, in the split head of the bearing arm 16, which frictionally receives and adjusts the bearing head 18$^b$, of the stop casing (see Figs. 11 and 12). In the forward movements of the actuating knob 20, a pawl 21, carried at the end of the pawl member 22, comes into engagement with the teeth of the actuating gear 19, the pawl member 22, being held to its work by means of a bow spring 23, carried on the base member 20$^a$, of the knob or spacing head 20. As a means of holding the pinion 14, into mesh with the adjacent gear wheel 7, a bow spring 24, is suitably mounted (see Figs. 1, 2 and 8 of the drawings) said spring having a notch portion 24$^a$, to form a seat for a pin 25, carried by one of the arms 16, said spring 24, riding over the pin 25, and also serving to hold the arms 16, and actuating mechanism carried thereby out of gear as shown in Fig. 8, whereby the carriage 1, may be moved up and down over the drawing board freely and without the concurrence of the actuating mechanism above described.

As a means of transmitting the motion given to the actuating or driving shaft 5, to the improved indicator or measuring instrument hereinafter described whereby the latter will indicate the movement or distance traveled by the carriage 1, the driving shaft 5, is provided with a beveled gear 26, meshing with a second beveled gear 27, carried by the transversely movable carriage 2, and as a means of permitting such carriage 2, to be moved transversely across the drawing board the small beveled gear 26, is provided with a key fitted in and adapted to travel in a longitudinally extending groove or key way 5$^a$, in the driving shaft 5, said beveled gear 26, being maintained in proper relative position to the gear 27, by means of bearing members 28, carried by the carriage 2, and slidably surrounding the driving shaft 5. The gear 27, is mounted upon a gear 29, the latter being disposed between the lower carriage plate 30, and the upper plate 2 of the carriage, the gear 29, being adapted to transmit motion to the indicator or measuring instrument when desired by the mechanism hereinafter referred to.

The protractor portion 2$^a$, of the carriage 2, carrying the radius arm 4, is provided with an adjusting knob or head 31, threaded on an adjusting bolt 32, the latter being provided with a clamping head 32$^a$, disposed beneath a clamp head 33, said bolt 32, passing through the clamp head 33, and through an intervening washer member 34, and through the protractor 2$^a$, whereby the radius arm 4, may be clamped or adjusted in any desired angular position the indicator point 33$^a$, of the clamp head extending above the graduated edge of the protractor indicating the angle in a well understood manner. As a means of sliding the radius arm longitudinally within the clamp head 33, as well as clamping such radius arm 4, in various adjusted positions the clamp head 33, is provided with a hooked flange 33$^b$, taking over and engaging with a similarly shaped hooked flange 4$^a$, in the radius arm.

As a means of slidably mounting and actuating the carriage 2, upon the vertically movable carriage 1, the latter is provided with a rack 1$^a$, near its top or ruling edge, said rack 1$^a$, being provided with an overhanging guide strip or member 1$^b$, and as a means of slidably securing and holding the carriage 2, in proper relative position the carriage 2, is provided with guide members 2$^b$, taking over and coöperating with the guide strip 1$^b$.

As a means of intermittently actuating or moving the carriage 2, and its radius arm 4, transversely across the drawing board and over and along the carriage 1, a suitable actuating regulating and spacing device is mounted upon the carriage 2, said device comprising a base member 35, mounted on the upper plate of the carriage 2, and an actuating knob 36, said actuating knob 36, being provided with a pawl carrying disk plate 37, the latter resting on a stop carrying friction ring 38. The stop carrying friction ring 38, is provided with an actuating handle 38$^a$, and a stop pin 38$^b$, for coöperating with and limiting the movements of a stop pin 37$^a$, extending out from the pawl carrying disk plate 37, said stop pin 37$^a$, being adapted to travel between the stop pin 38$^b$, and a second stop pin 35$^a$, on the base member 35. The base plate or member 35, is provided with a central opening receiving and containing a vertically extending actuating shaft 39, carrying a fixed actuating gear wheel 40, (see Figs. 5, 13 and 16) the latter being resisted in its circumferential movements by means of radially extending springs 40$^a$, adapted to travel in the opening or receptacle formed in the upper portion of the base plate 35, and adapted to hold the gear wheel 40, together with the connected mechanism by friction in the respective positions to which it may be moved by the pawls carried by the disk plate 37, as hereinafter described.

The actuating shaft 39, is provided with a second gear wheel 41, which latter meshes with and is adapted to actuate a third gear wheel 42, and as a means of throwing said third gear wheel into and out of engagement with the rack 1ª, of the carriage 1, a spring resisted lever 43, is pivotally mounted on the shaft 39, above the gear wheel 41, (see Fig. 5) said lever 43, carrying the gear wheel 42, and being provided at its outer end with a handle 43ª, said lever 43, being held in its respective positions by means of a bow spring 44, coöperating with a depending pin 45, on a lever arm 43ᵇ (see Fig. 3) it being apparent that as the offset or bent portion 44ª, of the spring 44, rides over the pin 45, carried by the lever such lever will be held either in the position shown in Fig. 3 for holding the gear wheel 42, in connection with the rack 1ª, or in its thrown out position whereby the carriage 2, may be moved freely along the carriage 1, independent of the intermittently actuating mechanism above referred to. As a means of moving the fixed gear wheel 4ª, intermittently by means of the actuating knob 36, the disk plate 37, carried by the latter is provided with a pair of spring resisted pawl levers 46 (see Figs. 14 and 15) the free ends of said pawl levers being provided with depending pawls 46ª, extending through suitable openings in the carrying plate 37, and arranged in such proximity to the gear wheel 40, that when said pawl levers are held in a like or neutral position as shown in Fig. 14 by the pawl actuating and reversing lever 47, both of the pawls 46ª, will be held out of contact with the actuating gear 40, and when the pawl reversing lever 47, is moved to one side as indicated by dotted lines in Fig. 15 one of the pawls will be thrown still farther away while the other will be thrown into engagement with the gear wheel 40, whereby the latter is actuated by the actuation of the knob 36, and pawl carrying disk plate 37. It will also be apparent that when the lever 47, is reversed to the reverse position indicated by dotted lines in Fig. 15, the opposite pawl will come into engagement with the gear 40, and actuate the latter in a reverse direction thereby carrying the transversely movable carriage 2, in an opposite direction over and above the drawing board and over and above the vertically movable carriage 1, it being apparent that the intermittent motion thus transmitted to the gear 40, will be transmitted from the latter through the medium of the second gear wheel 41, and a third gear wheel 42, when the latter is in engagement with the rack 1ª, as shown in Fig. 3 of the drawings in intermittently moving the carriage 2, to the right or to the left as above explained. It is also apparent that the throw or movement imparted to the parts through the medium of the actuating knob 36, may be regulated by moving the stop carrying friction ring circumferentially to the right or to the left thereby limiting the distance between the stop members 38ᵇ, and 35ª, so that the intermittent motion imparted to the carriage 2, and arm 4, carried thereby may be readily regulated as desired as in parallel ruling, cross hatching, and the like.

The improved indicating or measuring instrument for indicating the movements imparted to the vertically and transversely movable carriages 1 and 2, respectively, comprises a suitable casing 48, slidably and detachably mounted upon the face of the carriage 2, through the medium of a pivot pin 49, extending through an opening 48ª, in the rim portion of the casing 48, said casing 48, being provided with a central bearing portion 48ᵇ, (see Fig. 10) which bearing portion 48ᵇ, is provided with a vertical shaft 50, provided at its lower end with a disk head 50ª, and at its upper end with a reduced stem portion 50ᵇ, said reduced stem carrying a fixed peripherally flanged groove disk 51. The disk head 50ª, is provided with a removably mounted gear wheel 52, detachably secured by means of an attaching screw or element 52ª, said gear wheel 52, being adapted to receive its motion through suitable movable or floating gears hereinafter described, it being apparent that by changing the size of the gear wheel 50, as well as the floating or intermediate gears the scale of the drawings may be readily varied or regulated.

As a means of indicating upon the dial the distance traveled by one or the other of the carriages hereinbefore referred to when the indicator is connected therewith, the stem portion 50ᵇ, of the shaft 50, is provided with a loosely mounted vertically movable second or coöperating clutch member 53, having a bearing sleeve or stem 53ª, extending upwardly said stem 53ª, being provided with a heart cam 54, and an indicator needle 55, said heart cam being adapted to coöperate with and travel beneath a roller 56, carried upon the end of a spring resisted arm 57, the latter being connected upon the upper end of a vertical shaft 58, which shaft is provided at its lower end with a crank arm 59. The tension of the spring 60, may be regulated by adjusting the bracket arm 61, through the medium of the adjusting screw 61ª. It is the purpose of the spring pressed arm 57, carrying the roller 56, to automatically return the indicator needle 55, to its initial or starting position as shown in the drawings whenever pressure is released upon the clutch member 53, or the clutch is thrown out of connection with the shaft 50, by the mechanism hereinafter described.

As a means of simultaneously actuating or moving the clutch member 53, into frictional engagement with the clutch member 51, and moving the roller 56, out of engagement with the cam 54, so that the cam 54, may move freely without being impeded by the action of the spring pressed arm 57, while the clutch is in engagement with the shaft 50, and connected mechanism, the casing 45, is provided at one side with a crank arm 62, mounted between depending brackets 63, a controlling lever 62ª, of the crank extending to a carriage actuating and indicator controlling device or knob to be hereinafter described, the crank arm 62, being connected to a connecting link 64, connected to the crank arm 59, while the rear end of the crank arm 62, bears against the depending free end portion 65ª, of a horizontally extending lever 65, said lever 65, being pivoted between bearing members 66, on the face portion of the indicator casing, the free end of said lever 65, engaging with the sleeve or stem portion 53ª, of the upper or second clutch member 53, whereby the latter will be thrown into and out of engagement with the clutch 51, with the depression or elevation of the controller lever 62, leading to the carriage actuating and indicator controlling knob or device hereinafter referred to. By reason of the above construction it will be apparent that when the lever 62ª, is depressed the crank arm 62, will be moved rearwardly thereby moving the free end of the lever 65, downwardly and throwing the clutch into engagement with the shaft 50, and at the same time such movement will simultaneously move the crank arm 59, thereby moving the vertical shaft 58, and carrying the arm 57, and roller 56, away from the heart cam so that the latter is free to move without impeded action of the roller as the indicator needle is traveling to indicate the distance being moved by one of the carriages, and it will also be apparent that when pressure is released upon the controller lever 62ª, the spring 60, will throw the roller 56, into engagement with the heart shaped cam and the clutch being simultaneously released, the heart cam and indicator needle will be automatically returned to their initial positions as shown in Figs. 1 and 9 of the drawings.

Referring now to the improved carriage actuating and indicator controlling device or knob, together with the mechanism used and controlled in such connection for throwing the indicating or measuring instrument into and out of engagement with the actuating mechanism for moving the respective vertically and horizontally movable carriages 1 and 2, whereby the vertical and horizontal distances traveled by such carriages may be indicated on the dial of the instrument at all times, it will be seen that I provide the carriage 2, with a floating intermediate gear 67, carried upon an actuating lever 68, the latter being pivotally mounted between the plates of the carriage 2, through the medium of an upwardly extending and projecting bearing or pivot shaft 68ª, the position of the floating gear 67, being such that when the lever 68, is thrown to one position (a neutral or intermediate position being shown in the drawings) the gear 67, will be thrown into engagement with the gear 29, controlling the movements of the carriage 1, while when thrown to the opposite position the gear 67, will engage with the rack 1ª, of the carriage 1, and such movements of the carriages being transmitted to the indicator mechanism through the medium of the second gear 67ª, above the gear 67, and the gear wheel 52, on the shaft 50, the movements of such carriages will be constantly and automatically indicated on the dial of the indicator or measuring instrument, when the clutch is in engagement as hereinbefore described, through the medium of the controller knob to be hereinafter described.

As a means of shifting the gear carrying lever 68, to its respective positions, for the purposes hereinbefore referred to, the rear end of the lever is provided with a second vertically extending shaft 68ᵇ, and a vertically movable indicator controlling knob 69, is mounted therein, said knob being adapted to shift the lever 68, through a circumferential movement in one direction or the other and being also adapted to move the carriage 2, transversely to any desired position when the intermittent carriage actuating mechanism is not in engagement with the rack 1ª, of the carriage 1, and in so moving the downward pressure of the knob 69, upon the free end of the controller lever 62ª, acts to hold the clutch into engagement whereby the indicator needle will travel upon the dial to indicate the distance traveled by the carriage, and when it is desired to automatically return the indicator needle to its original position an upward movement of the knob 69, will release pressure on the controller lever 62ª, thereby returning the needle to its initial position as hereinbefore explained.

As a means of causing the gear wheel 52, on the shaft 50, to always remain in contact with the second gear 67ª, in its various shifted positions as hereinbefore referred to, the casing 48, is permitted to move or follow up the movements of the floating gears 67 and 67ª, by being pivoted on the pivot pin 49, at one side and acting against the resistance of a pivoted lever 70, mounted on a pivot screw 71, said lever 70, being resisted by means of a spring 72, which spring acts to press the outer or free end of the lever 70, toward the body of the casing thereby holding such casing toward the floating gearings above referred to. When it is desired to remove the casing 48, the pivoted lever 70, may be swung outwardly through the medium of the handle portion 70ª, and the casing 48, may then be lifted off of the carriage 2, by lifting it up vertically from the pivot pin 49, passing through the opening 48ª, of the rim portion of the casing.

As a means of holding the actuating lever 68, in its respective shifted positions the rear end of the lever is provided with a pointed portion 68ᶜ, coöperating with a pair of beveled teeth 73ª, formed at the free end of a coöperating spring resisted lever 73, the latter being mounted on a pivot 74, between the two plates of the carriage 2, said lever being also held to its work by the action of a spring 75, arranged and working in an obvious and well understood manner.

In the foregoing description, as well as in the appended claims, the word "vertically," and the words "transversely" or "horizontally," as applied to the movements imparted to the carriages 1 and 2, respectively, mean relative right angular movements on planes corresponding to the well known and correspondingly designated vertical and horizontal or base lines to be drawn upon the subjacent drawing paper or material on the drawing board.

From the foregoing description, taken in connection with the accompanying drawings, the operation and advantages of my invention will be readily understood.

Having thus described one of the embodiments of my invention, what I claim and desire to secure by Letters Patent, is,—

1. In a drafting instrument, the combination with a drawing board, and vertically and transversely movable correlated carriages mounted thereon; of an indicator instrument mounted on one of said carriages, and a combined carriage actuating and indicator controlling device for throwing said indicator instrument into and out of operation for causing the same to indicate the relative movements imparted to said carriages.

2. In a drafting instrument, a drawing board provided with a vertically movable connected transversely extending carriage, means for moving and holding said carriage in fixed relation to said drawing board, a second carriage mounted on and transversely movable on said first mentioned carriage, carriage actuating mechanism carried by the respective carriages, an indicator carried by said transversely movable carriage, and an indicator controller device carried by said last mentioned carriage.

3. In a drafting instrument, the combination with a drawing board having vertically and transversely movable connected carriages mounted thereon, and means for actuating said carriages independently of each other; of an indicator mounted on said transversely movable carriage, and a carriage actuating and indicator controller device mounted on the latter whereby said indicator may be thrown into and out of engagement with the respective carriage actuating means.

4. In a drafting instrument, the combination with a drawing board provided with a vertically movable transversely extending carriage, and a transversely movable carriage mounted thereon; of an indicator instrument mounted on said transversely movable carriage, and carriage actuating and indicator controller means carried by said transversely movable carriage for controlling said indicator instrument and for causing the same to indicate the movements imparted to said carriages.

5. In a drafting instrument, the combination with a drawing board provided with correlated vertically and transversely movable carriages, and means for actuating spacing and stopping said carriages, of an indicator or measuring instrument on said transversely movable carriage, and carriage actuating and indicator controller means mounted on said transversely movable carriage independently of said actuating spacing and stopping mechanism whereby said carriages may be moved either simultaneously with or independently of the actuation of said indicator or measuring instrument.

6. In a drafting instrument, the combination with a drawing board and vertically and transversely movable correlated carriages each provided with carriage actuating and spacing mechanism for intermittently moving said carriages, and means for varying the movements imparted to said carriages by said actuating and spacing mechanism; of an indicator instrument mounted on said transversely movable carriage and an independent carriage actuating and indicator controller device for operating said carriages independently of said carriage actuating and spacing mechanism and for registering the movements imparted to said carriages.

7. In a drafting instrument, a drawing board, a vertically movable transversely extending carriage mounted thereon, a transversely movable carriage mounted on and carried by said vertically movable carriage, carriage actuating spacing and stopping mechanism carried by the respective carriages, and an indicator instrument and indicator controller and carriage actuating devices carried by said transversely movable carriage and operable independently of said carriage actuating spacing and stopping mechanism for indicating or measuring the distances traveled by said carriages and for controlling said indicator instrument.

8. In a drafting instrument, a drawing board, a vertically movable transversely extending carriage mounted thereon, a second carriage transversely movable on said first mentioned carriage, carriage actuating spacing and stopping mechanism carried by each of said carriages, an indicator instrument mounted on said transversely movable carriage and adapted to indicate the movements imparted to either of said carriages, and an independent carriage actuating and indicator controller device mounted on said transversely movable carriage for throwing said indicator instrument into and out of operation and into and out of connection with either of said carriages.

9. In a drafting instrument, a drawing board, vertically and transversely movable carriages mounted thereon, said vertically movable carriage extending across the drawing board forming a ruling member, and said transversely movable carriage being mounted on said vertically movable carriage and provided with a protractor and a radius arm, carriage actuating spacing and stopping mechanism carried by the respective carriages, an indicator instrument carried by said transversely movable carriage, and carriage actuating and indicator controller means mounted on said transversely movable carriage for indicating the distances traveled by the respective carriages and for automatically returning the indicator needle to its initial position after each working movement or impulse given to the respective carriages.

10. In a drafting instrument, a drawing board, transversely and vertically movable carriages mounted thereon, carriage actuating spacing and stopping mechanism carried by the respective carriages, suitable gearing in said transversely movable carriage connected with the carriage actuating spacing and stopping mechanism of said vertically movable carriage, an indicator instrument mounted on said transversely movable carriage, a shifting or actuating lever provided with floating gears in contact at all times with said indicator instrument, and an indicator controller knob mounted on said shifting or actuating lever whereby to move said floating gears into and out of engagement with the respective carriage actuating mechanism to register the movements imparted thereto or to a neutral or non-registering position.

11. In a drafting instrument, a drawing board provided at its sides with guide racks, a vertically movable carriage extending transversely across said drawing board, a driving shaft on said carriage provided at its opposite ends with carriage actuating and sustaining wheels in engagement with said guide racks, means on said carriage for intermittently moving one of said actuating and sustaining wheels, a transversely movable carriage on said vertically movable carriage provided with a radius arm and a protractor, means for moving said transversely movable carriage, an indicating instrument on said last mentioned carriage, and means for throwing said instrument into and out of connection with the actuating mechanism of either of said carriages whereby the movements or distances traveled by said carriages will be indicated.

12. In a drafting instrument, the combination with a vertically movable transversely extending carriage provided with a carriage actuating or driving shaft, and carriage actuating spacing and stopping mechanism adapted to be thrown into and out of communication with said driving shaft; of a transversely movable carriage mounted on said vertically movable carriage and provided with gearing slidably connected with said actuating and driving shaft, carriage actuating spacing and stopping mechanism carried by said transversely movable carriage and adapted to be thrown into and out of engagement with said vertically movable carriage, an indicator instrument mounted on said transversely movable carriage and provided with a controller lever, a shifting lever provided with a floating gear in communication with said indicator instrument and adapted to be thrown into and out of communication with said gearing of said transversely movable carriage connected to said carriage actuating driving shaft, and a vertically movable indicator controller knob bearing on said controller lever of said indicator instrument and mounted on said shifting lever and carrying said floating gears.

13. In a drafting instrument, a drawing board, correlated carriages vertically and transversely movable thereon, an indicator on one of said carriages, means for moving said carriages, and means for controlling said indicator.

14. In a drafting instrument, a drawing board, correlated vertically and transversely movable carriages connected therewith, an indicator, and carriage actuating and indicator controller mechanism operable from one of said carriages.

15. In a drafting instrument, a drawing board, vertically and transversely movable correlated carriages connected therewith, carriage actuating and controlling mechanism, and an indicator operable from and controlled by said carriage actuating and controlling mechanism.

16. In a drafting instrument, a drawing board, vertically and transversely movable correlated carriages each provided with carriage actuating and spacing mechanism, an indicator instrument mounted on one of said carriages, and independent carriage actuating and indicator controller devices for operating said carriages independently of said intermittent carriage actuating and spacing mechanism and for indicating the relative movements imparted to said carriages.

17. In a drafting instrument, a drawing board provided with correlated vertically and transversely movable carriages, means for actuating spacing and stopping said carriages, an indicator on one of said carriages, and carriage actuating and indicator controller mechanism operable independently of said actuating spacing and stopping mechanism whereby said carriages may be moved either simultaneously with or independently of the actuation of said indicator.

In testimony whereof I have affixed my signature in presence of two witnesses.

RICHARD G. SHILEY.

Witnesses:
 GEO. E. KRICKER,
 O. C. BILLMAN.